Sept. 11, 1928.
D. E. AUSTIN
1,683,813
VALVE MEANS
Filed Dec. 16, 1924
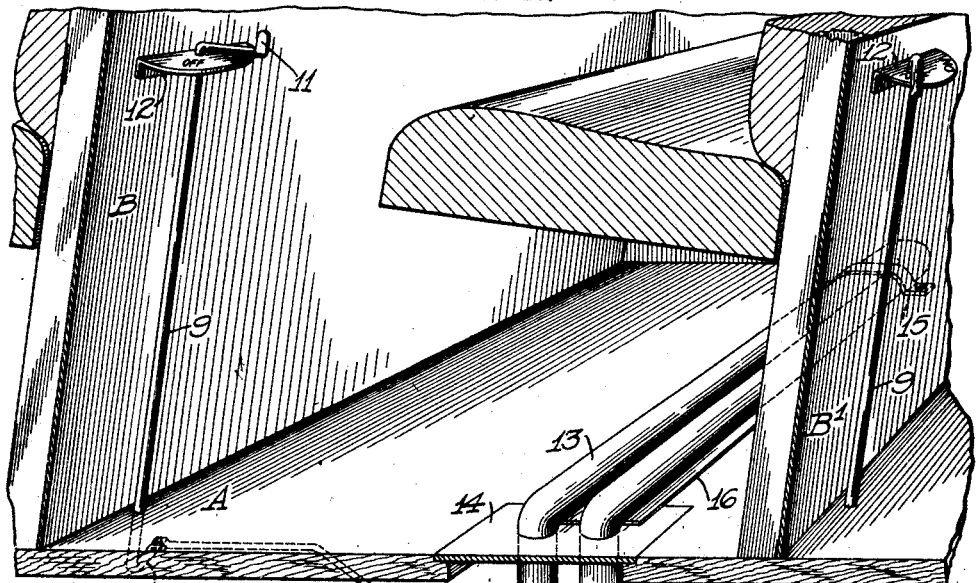
FIG. 1.
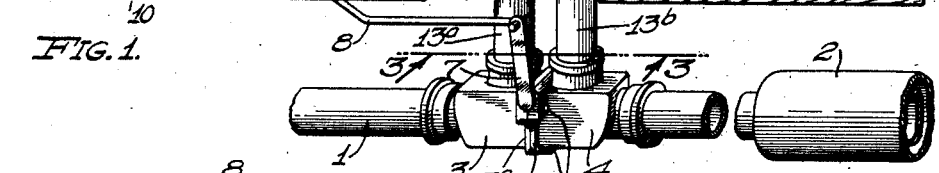
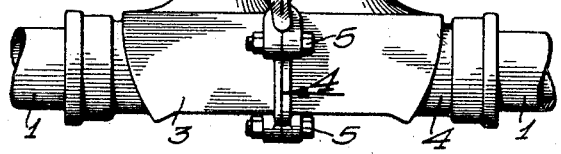
FIG. 2.
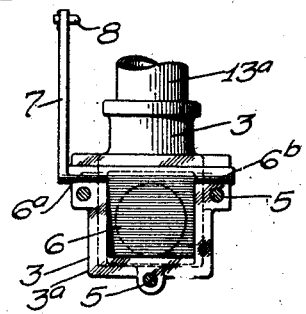
FIG. 4.
FIG. 3.
Inventor
DWIGHT E. AUSTIN.
By A. B. Bowman
Attorney Patented Sept. 11, 1928.

1,683,813

UNITED STATES PATENT OFFICE.

DWIGHT E. AUSTIN, OF LOS ANGELES, CALIFORNIA, ASSIGNOR TO THE PICKWICK CORPORATION, OF LOS ANGELES, CALIFORNIA, A CORPORATION OF CALIFORNIA.

VALVE MEANS.

Application filed December 16, 1924. Serial No. 756,323.

My invention relates to a valve means applicable particularly for controlling the exhaust gases of the engine of automotive vehicles, more particularly automobiles of all kinds and classes, and the objects of my invention are: First, to provide a heating means which may be readily connected with the exhaust conductor of an internal combustion engine and through which the exhaust or burnt gases of the engine may be directed for heating the heating element of the heating means; second, to provide a heating means of this class whereby a plurality of separate and independent heating elements may be connected with the exhaust conductor of the engine for heating various portions of the vehicle, as desired, and whereby the heated exhaust gases, adapted to heat the several heating elements may be readily controlled from the separate compartments of the vehicle; third, to provide a novel coupling structure for connecting the tubular heating element of the heating means with the exhaust conductor of the engine; fourth, to provide a novel valve structure for efficiently diverting the heated exhaust gases to the tubular heating coil or element or for by-passing the heated exhaust gases to other heating elements or to the atmosphere; fifth, to provide a coupling structure consisting of a pair of oppositely disposed interchangeable coupling members having a valve member pivotally mounted between said members and operable in one of the same; sixth, to provide a novel coupling and valve structure in connection with the exhaust conductor of an internal combustion engine for diverting the exhaust gases from the normally direct passage to the muffler of the engine; seventh, to provide a novel heating means for automotive vehicles, and eighth, to provide a means of this class which is very simple and economical of construction, durable, easy to install, easy to control, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary perspective view of a passenger compartment of a vehicle, showing my engine exhaust heating means installed therein and the means for controlling the same, and showing portions of the vehicle in section and the exhaust conductor of the engine and the muffler of the vehicle fragmentarily and in section to facilitate the illustration; Fig. 2 is a side view of the coupling and valve structure of my means; Fig. 3 is a longitudinal sectional elevation view thereof, taken on a vertical plane passing through 3—3 of Fig. 1, and Fig. 4 is a transverse sectional view thereof, taken through 4—4 of Fig. 2.

Like characters of reference refer to similar parts and portions throughout the several views of the drawings.

The exhaust conductor 1, muffler 2, coupling members 3 and 4, bolts 5, valve member 6, valve member actuating arm 7, connecting rod 8, valve control rod 9, arms 10 and 11, quadrant member 12, heating element 13, plate 14, strap 15, and the heat insulation 16, constitute the principal parts and portions of my heating means.

The valve structure of my heating means is positioned in and directly connected with the exhaust conductor 1 connected at one end with the engine of the vehicle, not shown, and at the other end with the muffler 2 of the vehicle. The valve structure consists of a pair of oppositely disposed identical or interchangeable coupling members 3 and 4 which are provided, respectively, at their adjacent ends with abutting flanges 3ª and 4ª and are secured to each other at said adjacent ends by means of bolts 5. The outer ends of said coupling members are secured in any suitable manner to the separate members of the exhaust conductor 1. These coupling members form with each other and the conductor 1, a continuous passage from the engine to the muffler when not obstructed by the valve member 6. Each of said coupling members is provided, respectively, with side outlets 3ᵇ and 4ᵇ which are connected respectively with the ends 13ª and 13ᵇ of the heating member 13. At one side of the longitudinal passages of the coupling members and at their abutting ends are provided semicircular portions 3ᶜ and 4ᶜ, which form when said coupling members are secured together in the manner stated, circular holes in which are journaled or pivotally supported the lugs or supporting portions 6ᵃ and 6ᵇ at the one end of the valve member 6. This valve member 6 is pivotally mounted between said coupling members, but extends into one of said coupling members only and is adapted to divert the exhaust gases into the heating tube or element 13, when said valve member is positioned as shown in Fig. 3, or directly through said coupling members into or towards the muffler. The middle portion of the valve structure or the inner ends of the coupling members are considerably enlarged and preferably rectangular in cross-section, as shown best in Figs. 1 and 4 of the drawings.

The identical or interchangeable construction of the members 3 and 4 permits of great economy in manufacturing, installation, and the positioning of the valve member in either one of two positions desired.

At the outer end of the one lug 6ᵃ is provided an extended arm 7, the outer end of which is pivotally connected by means of a rod 8 with the extended end of an arm 10 secured at its opposite end to the lower end of the valve control rod 9. This valve control rod 9 is pivotally mounted at the back B of the seat structure of the vehicle. Said rod extends at its lower end through the floor A of the vehicle, and is pivotally supported at its upper end in a quadrant member 12 secured to the back member B. The upper end of the rod 9 is provided with a control arm 11, which preferably frictionally or otherwise engages the quadrant member 12 for positioning the valve member 6 in any desired position.

The heating member 13 is preferably made in the form of a U-shaped tube bent at right angles at its open ends and connected to the coupling members 3 and 4, as previously stated. The floor A of the vehicle is preferably provided at the portion through which the downwardly bent portions 13ᵃ and 13ᵇ of the heating element extend, with a metallic plate 14 to protect the floor of the vehicle and to permit ready removal of the heating element when desired. The extended end of the heating element is preferably secured to the floor of the vehicle by means of a strap 15, as shown by dotted line in Fig. 1. The floor of the vehicle is also protected by means of an asbestos insulation 16 positioned between the heating element and the floor.

The complete heating unit, shown in Fig. 1, may be duplicated as often as necessary to properly heat the various portions or several compartments of the vehicle, the valve control means of another unit being shown at the back of the seat B¹.

It will be here noted that instead of diverting the exhaust gases into the heating element 13, as shown in the drawings, the gas may be diverted into the atmosphere, and by closing the side outlet 4ᵇ, an effective cut-out means is provided for the exhaust gases of the engine.

It is obvious from this construction, as illustrated, in the drawings and disclosed in the foregoing specification, that there is provided a heating means for automotive vehicles and a novel coupling and valve structure, as aimed at and set forth in the objects of the invention, and though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a means of the class described, a pair of abutting, oppositely disposed interchangeable coupling members secured together at their one ends and provided with a side opening in each coupling member, a valve member pivotally mounted between said coupling members, and a tubular bipass member with one end communicating with the opening in one of the said coupling members and its other end communicating with the opening in the other coupling member.

2. In a means of the class described, a pair of abutting coupling members secured together at their one ends and provided with a side opening in each coupling member, a valve member pivotally mounted between and supported by said coupling members, and a bipass with its inlet communicating with one of the said openings and its return end communicating with the other of the said openings.

3. In a coupling and valve structure, a pair of abutting oppositely disposed interchangeable coupling members secured together at their one ends and provided respectively with a side outlet and a side inlet, and a valve member pivotally mounted between and supported by said coupling members.

4. In a means of the class described, a pair of abutting oppositely disposed interchangeable coupling members secured together at their one ends and provided with a side opening in each coupling member, a valve member pivotally mounted between and supported by said coupling members, conductors connected to the one ends of said coupling members and forming a continuous passage therethrough when said valve member is shifted in one direction, and a tubular bipass member connected at its end to one of the said side openings of said coupling members, and at its other end to the other side opening.

5. In a coupling and valve structure, a pair of oppositely disposed interchangeable coupling members secured together in abutting relation forming a continuous passage therethrough, and a valve member pivotally mounted at one edge at the abutting ends of said coupling members.

6. In a coupling and valve structure, a pair of oppositely disposed interchangeable coupling members secured together in abutting relation forming a continuous passage therethrough, and a valve member pivotally mounted at one edge at the abutting ends of said coupling members, said coupling members being provided with a side outlet and a side inlet adapted to communicate with the continuous passage through said coupling members, said valve member adapted to close said side inlet when shifted in one direction and said continuous passage when shifted in the opposite direction.

7. In a coupling and valve structure, a pair of oppositely disposed interchangeable coupling members secured together at their abutting ends and forming a continuous passage therethrough, and a valve member pivotally mounted at one edge at the abutting ends of said coupling members and extending into one only of said coupling members.

8. In a means of the class described, a pair of abutting, oppositely disposed, interchangeable coupling members secured together at their corresponding ends, each provided with a side opening, and a plate valve member pivotally mounted between said coupling members and adapted to close either the passage between the same or the side opening in one of the coupling members.

9. In a coupling and valve structure, a pair of oppositely disposed identical coupling members secured together in abutting relation at their corresponding ends and forming a continous passage therethrough, and a plate valve member, having trunnion portions at the opposite ends of its one edge, said trunnion portions being pivotally supported by and between the abutted ends of said coupling members and adapted to close the passage therebetween.

10. In a means of the class described, a pair of oppositely disposed interchangeable coupling members secured with their corresponding ends adjacent each other forming a continuous passage therethrough, each coupling member having a side opening, and valve means mounted in said passage with its pivotal axis between the adjacent ends of the coupling members, for controlling the flow of fluid through said passage and said side openings.

In testimony whereof, I have hereunto set my hand at Los Angeles, California, this 4th day of December, 1924.

DWIGHT E. AUSTIN.